(12) United States Patent
Eisenhardt

(10) Patent No.: US 8,436,561 B2
(45) Date of Patent: May 7, 2013

(54) METHOD AND DEVICE FOR MONITORING THE STARTUP OF AN ELECTRIC DRIVE

(75) Inventor: Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 13/128,592

(22) PCT Filed: Dec. 18, 2009

(86) PCT No.: PCT/EP2009/067487
§ 371 (c)(1),
(2), (4) Date: Jul. 8, 2011

(87) PCT Pub. No.: WO2010/079082
PCT Pub. Date: Jul. 15, 2010

(65) Prior Publication Data
US 2011/0266985 A1    Nov. 3, 2011

(30) Foreign Application Priority Data

Jan. 9, 2009 (DE) .......................... 10 2009 000 120

(51) Int. Cl.
*H02H 7/08* (2006.01)
*H02P 1/00* (2006.01)
*H02P 21/00* (2006.01)
*H02P 1/04* (2006.01)
*H02P 27/00* (2006.01)

(52) U.S. Cl.
USPC ................. 318/400.21; 318/139; 318/400.02; 318/430; 318/474; 318/701

(58) Field of Classification Search ................... 318/139, 318/400.02, 400.21, 430, 474, 701
See application file for complete search history.

(56) References Cited

U.S. PATENT DOCUMENTS

| | | | |
|---|---|---|---|
| 5,731,669 A * | 3/1998 | Shimizu et al. | 318/139 |
| 2005/0257977 A1 | 11/2005 | Kamiya | |
| 2007/0222408 A1* | 9/2007 | Hughes | 318/701 |
| 2008/0042606 A1* | 2/2008 | Chen | 318/474 |
| 2008/0100243 A1* | 5/2008 | Kurosawa et al. | 318/430 |
| 2008/0315909 A1 | 12/2008 | Romano | |
| 2010/0225257 A1* | 9/2010 | Masfaraud et al. | 318/400.02 |

FOREIGN PATENT DOCUMENTS

| | | |
|---|---|---|
| DE | 198 16 046 | 10/1999 |
| DE | 198 35 576 | 11/1999 |
| DE | 10 2005 049070 | 4/2007 |

* cited by examiner

*Primary Examiner* — Walter Benson
*Assistant Examiner* — Gabriel Agared
(74) *Attorney, Agent, or Firm* — Kenyon & Kenyon LLP

(57) ABSTRACT

A method and a device for monitoring the startup of an electric drive, which has a polyphase machine, a pulse-controlled inverter and a control unit. The control unit is provided to compare rotational speed values that are successive in time to one another during the startup of the drive, and when recognizing a non-increase in the rotational speed of the rotor shaft, to detect a mixup of phase lines or pulse-controlled inverter lines.

4 Claims, 2 Drawing Sheets

METHOD AND DEVICE FOR MONITORING THE STARTUP OF AN ELECTRIC DRIVE

BACKGROUND INFORMATION

In electric drives for hybrid and electric vehicles, usually these days, three-phase polyphase machines are used. In the operation of these polyphase machines, pulse-controlled inverters are used having field-oriented regulation. In such a field-oriented regulation, information is required on the rotational speed and the position of the rotor.

A method and a device are described in German Patent No. DE 10 2005 049 070 for the field-oriented regulation of a polyphase machine. The actual torque of the polyphase machine is ascertained, in this instance, and the actual torque ascertained is compared to a setpoint torque, and when there are deviations from the torque, the setpoint values for the flux-forming current and the torque-forming current are changed, so as to bring the actual torque into agreement with the setpoint torque. The actual torque is calculated using the measured phase currents and machine constants of the polyphase machine. Among other things, information is taken into account, in this instance, on the rotational speed of the rotor shaft of the polyphase machine. A control unit is used for carrying out the calculation processes mentioned and for controlling the switching elements of the pulse-controlled inverter, and it converts the measuring signals supplied to it into control signals for the switching elements of the pulse-controlled inverter.

To record the position and the rotational speed of the rotor, pulse generators may be used, for example, which have a specified angular offset with respect to one another and which scan a pulse generator wheel. The position ascertainment takes place by an evaluation of the signals supplied by the pulse generators.

If phase lines or pulse generator lines are mixed up by mistake when the pulse-controlled inverter and the polyphase machine are assembled, the rotor cannot start up in spite of a torque that is set to be sufficiently large.

SUMMARY OF THE INVENTION

The method according to the present invention has the advantage that an exchange of phase lines or pulse generator lines, that may possibly have taken place, is detected by monitoring the startup of the electric drive. This is achieved, essentially, by the control unit monitoring whether the rotational speed of the rotor, starting from a rest position, changes in a positive rotational direction at a sufficiently great setpoint torque.

If this change in the rotational speed does not occur, and if there is no defect in the pulse-controlled inverter and also no defect in the polyphase machine, the control unit concludes from this that either there has been an exchange of phase lines or an exchange of pulse generator lines, initiates a suitable error reaction and files an error entry in an error memory.

DETAILED DESCRIPTION

Figure 1:
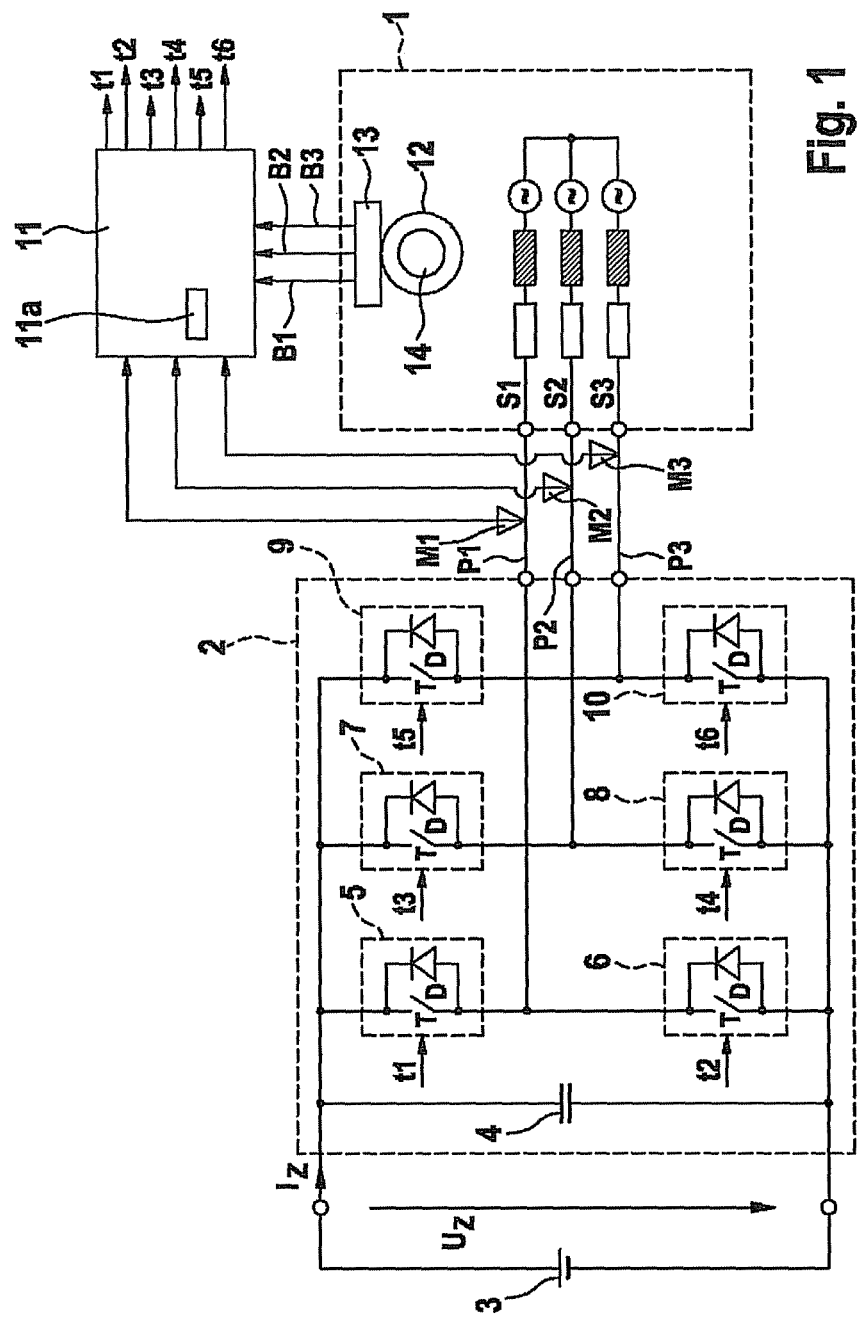
FIG. 1 shows a sketch of a polyphase machine having an associated power section.

The polyphase machine shown in FIG. 1 includes three drive phases connected to one another in star connection, which are designated in FIG. 1 by S1, S2, S3.

Polyphase machine 1 is connected to a pulse-controlled inverter 2, which in turn is connected to a battery 3. Battery 3 is used to supply the users of a vehicle electrical system, which are not shown in FIG. 1.

The pulse-controlled inverter is wired in such a way that each of the phases S1, S2, S3 is connected to a connection point between two pulse-controlled inverter elements 5/6, 7/8, 9/10 and the other connections, respectively, of the pulse-controlled inverter elements are conductively connected to one another. Pulse-controlled inverter elements 5, 6, 7, 8, 9, 10 are each made up of a parallel circuit of a switching transistor T and a freewheeling diode D. The switching transistors of the pulse-controlled inverter elements are each acted upon by a control signal t1, t2, t3, t4, t5, t6. These control signals are supplied by a control unit 11.

Moreover, an intermediate circuit capacitor 4 is connected between the respectively other terminals of the pulse-controlled inverter elements, over which the intermediate circuit voltage $U_Z$ drops off. The two terminals of intermediate circuit capacitor 4 are connected to the vehicle electrical system of the vehicle, of which battery 3 is shown in FIG. 1. As may further be seen in FIG. 1, intermediate circuit current $I_Z$ flows from the vehicle electrical system into the pulse-controlled inverter.

Phase S1 of polyphase machine 1 is connected to pulse-controlled inverter 2 via a phase line P1. Phase S2 of polyphase machine 1 is connected to pulse-controlled inverter 2 via a phase line P2. Phase S2 of polyphase machine 1 is connected to pulse-controlled inverter 2 via a phase line P3. Ammeters M1, M2 and M3 are provided at these phase lines P1, P2 and P3, which route data on the measured phase currents to control unit 11.

Polyphase machine 1 has a rotor shaft 14 on which a pulse generator wheel 12 is fastened. This cooperates with a pulse generator sensor system 13 which is connected to control unit 11 via pulse generator lines B1, B2 and B3. Using the signals supplied to it, it ascertains the actual torque of the rotor shaft, compares it to a setpoint torque, and provides control signals t1, t2, t3, t4, t5 and t6 for pulse-controlled inverter elements 5, 6, 7, 8, 9 and 10 of pulse-controlled inverter 2, as a function of the torque difference ascertained.

Moreover, control unit 11 is provided for monitoring the startup of the electric drive, and, in the process, to detect a mixup that could possibly have taken place in phase lines P1, P2, P3 or pulse generator lines B1, B2, B3. For this purpose, the control unit monitors whether the rotational speed of the rotor shaft, starting from a state at rest of the rotor, changes in a specified rotational direction at a sufficiently large setpoint torque.

Figure 2:
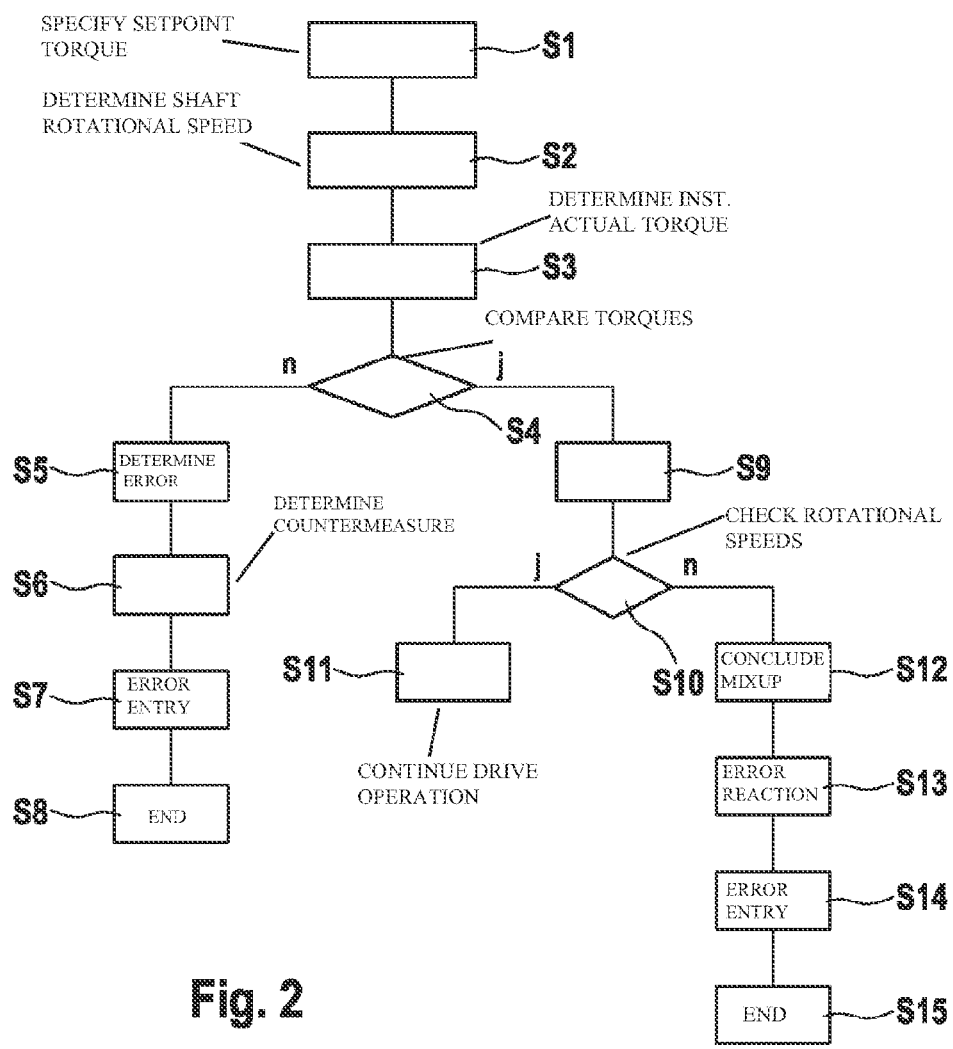
FIG. 2 shows a flow chart for explaining a method for monitoring the startup of an electric drive.

This will be explained below with reference to FIG. 2, which shows a flow chart for explaining a method for monitoring the startup of an electric drive.

In a first step S1, control unit 11 first specifies a sufficiently great value for the setpoint torque. By an evaluation of the measuring signals supplied to it, control unit 11, in a step S2, then first ascertains the rotational speed of the rotor shaft, for the phase currents and the signals supplied to it via the pulse generator lines, and after that, in step S3, using the rotational speed calculated, ascertains the instantaneous actual torque according to the following relationship:

$$M_{ACTUAL} = K^* I_D^* I_Q.$$

Thereafter, in a step S4, control unit 11 compares the specified setpoint torque to the actual torque ascertained. If this comparison shows that the actual torque is equivalent to the setpoint torque, the control unit concludes from this that pulse-controlled inverter 2 and polyphase machine 1 are functionally in order, and goes over to step S9. In step S9, control unit 11 compares successive rotational speed values to one another. In step S10 there follows a query. During this query, if the control unit detects that, in spite of the pulse-controlled inverter and the polyphase machine being error-free, the rotational speed of rotor shaft 14 does not increase, it goes over to step S12. According to this step S12, the control unit concludes that there has been a mixup in either the phase lines or a mixup in the pulse generator lines.

After that, in step S13, the control unit initiates a suitable error reaction, and in step S14 it files an appertaining error entry in an error memory 11a. A suitable error reaction would be, for instance, to switch off the pulse-controlled inverter. Step S15 represents the end of the method.

If it is detected in step S10 that successive rotational speed values are increasing, the method goes over to step S11. According to step S11, the operation of the electric drive is continued.

If it is detected in step S4 that the actual torque does not agree with the setpoint torque, the program goes over to step S5. In the latter step it is recognized that there is an error in the polyphase machine or the pulse-controlled inverter. Thereupon, in step S6, a suitable countermeasure is initiated. This may be, for instance, deactivating the pulse-controlled inverter. When this has occurred, transition to step S7 takes place, according to which an associated entry is made in the error memory. Step S8 forms the end of the method.

The device shown in FIG. 1 is able to be used especially in connection with pulse-controlled inverter/control units for the electric drive of a hybrid vehicle, but may also be used in the case of other electric drives.

What is claimed is:

1. A method for monitoring a startup of an electric drive including a polyphase machine having a rotor shaft, a pulse-controlled inverter, having pulse-controlled inverter elements, that is connected to the polyphase machine via phase lines, and a control unit for making available control signals for the pulse-controlled inverter elements and is connected to a pulse generator sensor system via pulse generator lines, the method comprising:

performing the following, in the control unit, in a startup phase of the electric drive:

specifying a setpoint torque;

calculating a rotational speed of the rotor shaft and an actual torque from supplied measuring signals;

comparing the setpoint torque to the actual torque; and in the case of an agreement of the actual torque with the setpoint torque, comparing rotational speed values, that are successive in time, to one another, and when a non-increase in the rotational speed of the rotor shaft is recognized, detecting a mixup of phase lines or pulse generator lines.

2. The method according to claim 1, wherein after the detection of a mixup of phase lines or pulse generator lines, the control unit deactivates the pulse-controlled inverter.

3. The method according to claim 1, wherein after the detection of a mixup of phase lines or pulse generator lines, the control unit makes an entry in an error memory.

4. A device for monitoring a startup of an electric drive including a polyphase machine having a rotor shaft, and a pulse-controlled inverter, having pulse-controlled inverter elements, connected to the polyphase machine via phase lines, the device comprising:

a control unit for making available control signals for the pulse-controlled inverter elements and is connected to a pulse generator sensor system via pulse generator lines, wherein the control unit, in a startup phase of the electric drive, performs the following:

specifying a setpoint torque;

calculating a rotational speed of the rotor shaft and an actual torque from supplied measuring signals;

comparing the setpoint torque to the actual torque; and in the case of an agreement of the actual torque with the setpoint torque, comparing rotational speed values, that are successive in time, to one another, and when a non-increase in the rotational speed of the rotor shaft is recognized, detecting a mixup of phase lines or pulse generator lines.

* * * * *